(12) United States Patent
Fujime

(10) Patent No.: US 6,415,273 B1
(45) Date of Patent: Jul. 2, 2002

(54) METHOD OF FEED-FORWARD CONTROL USING CONTROL LOGIC WITH ANTICIPATORY LEARNING CONTROL

(75) Inventor: Yoko Fujime, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/249,194

(22) Filed: Feb. 12, 1999

(30) Foreign Application Priority Data

Feb. 12, 1999 (JP) .......................................... 10-029895

(51) Int. Cl.$^7$ .......................... G06F 15/18; G06F 17/00
(52) U.S. Cl. .............................. 706/16; 706/23; 706/46; 706/903
(58) Field of Search ........................... 706/16, 48, 903, 706/23

(56) References Cited

U.S. PATENT DOCUMENTS

| | | | |
|---|---|---|---|
| 5,925,089 A | 7/1999 | Fujime | 701/106 |
| 5,954,783 A | 9/1999 | Yamaguchi et al. | 701/106 |

FOREIGN PATENT DOCUMENTS

| | | | |
|---|---|---|---|
| EP | 0326 065 A2 | | 8/1989 |
| EP | 0 594 318 A1 | | 4/1994 |
| EP | 0 724 073 A2 | | 7/1996 |
| JP | 10027008 | | 1/1998 |
| JP | 10122017 | | 5/1998 |
| JP | 10-122017 | * | 5/1998 |
| JP | 10-205377 | * | 8/1998 |
| JP | 10-205378 | * | 8/1998 |
| JP | 10-274082 | * | 10/1998 |

OTHER PUBLICATIONS

Hiroshi Inagaki, et al., An Adaptive Fuel Injection Control with Internal Model in Automotive Engine, Proceedings of the Annual Conference of the Industrial Electronics Society (IECON), US, New York.

Hitoshi Shiraishi, CMAC Neural Network Controller for Fuel–Injection Systems, IEEE Transactions on Control System Technology, US, IEEE, New York, Bd. 3,Nr. 1, 1. Mar. 1995.

* cited by examiner

*Primary Examiner*—George B. Davis
(74) *Attorney, Agent, or Firm*—Knobbe, Martens, Olson and Bear, LLP

(57) ABSTRACT

A machine control system for controlling an unstable or transition running condition of a machine which is operable by a causative signal and the performance of which is indicatable by an indicative signal. The control system includes: (a) a model-based control unit for outputting an estimated value of a causative signal when receiving an indicative signal, which model-based control unit undergoes learning based on teacher data; (b) a feedback control unit for providing first teacher data to the model-control unit upon receiving feedback information from the machine; and (c) an anticipatory control unit for providing second teacher data to the model-based control unit. The anticipatory control unit includes: (i) a deviation detection program programmed to determine whether the running condition of the machine deviates from a predetermined stable running condition; and (ii) a compensation formulation program programmed to formulate anticipatory compensations to compensate for deviation of the machine from the predetermined stable running condition based on feedback information received from the machine, output from which program is provided to the model-based control unit as second teacher data.

12 Claims, 11 Drawing Sheets

METHOD OF FEED-FORWARD CONTROL USING CONTROL LOGIC WITH ANTICIPATORY LEARNING CONTROL

BACKGROUND OF THE INVENTION

This invention relates to a method of feed-forward control of a machine using a control logic model (or map) capable of learning, and particularly to a feed-forward control method based on anticipated or estimated deviation of the machine from the control logic model (or map), which method allows rapid learning and highly responsive control.

Heretofore, a feed-forward control system has been employed in various technological areas for controlling a subject, wherein behavior of the subject in response to input is estimated using a model of the subject.

By using the feed-forward control, it is possible to improve responsive characteristics of the control in response to change in input and to operate the control subject in optimum conditions. However, the subject itself is likely to be influenced by environmental changes, and cause deterioration with time. As a result, deviation occurs sometimes between the actual subject and the model constituted in advance. Thus, it is necessary to adjust or compensate for the deviation as necessary.

A learning method is known as a method for compensating for the deviation of the machine, comprising the steps of feeding actual output from the subject back to the control system, compensating for the deviation based on the feedback value, formulating teacher data based on a compensation obtained when the feedback is stabilized, and undergoing learning using the teacher data.

According to the above learning method based on the actual output from the subject, the teacher data is obtained from the actual output. Thus, deviation between the subject and the model can be detected accurately, thereby leading to accurate learning. However, first, because it takes time until the feedback is stabilized, a long period of time is required for obtaining teacher data. Second, because teacher data is obtained through feedback control, control of the subject must be continued when obtaining teacher data, regardless of its using conditions or using circumstances. Further, the above control must be continued until the feedback is stabilized. Thus, it is extremely difficult to obtain satisfactory teacher data without influencing behavior of the subject.

An objective of the present invention is to resolve the above problems in the above conventional learning method, by providing a method for performing learning by rapidly obtaining teacher data wherein deviation of a machine from a model in feedback control is estimated using a control logic capable of learning which allows timely modification of the model.

SUMMARY OF THE INVENTION

One important aspect of the present invention attaining the above objective is to provide a machine control system for controlling performance of a machine which is operable by a causative signal and the performance of which is indicatable by an indicative signal. The control system comprises: (a) a model-based control unit for outputting an estimated value of a causative signal when receiving an indicative signal, wherein the input-output relationship of the model-based control unit is the inverse of that of the machine, which model-based control unit receives a target value of the indicative signal and is provided with a learning function which modifies output from the model-based control unit based on teacher data; (b) a feedback control unit for providing first teacher data to the model-control unit, which feedback control unit receives feedback information of an actual value of the indicative signal from the machine, and provides the feedback information to the model-based control unit as first teacher data, wherein the model-based control unit undergoes learning using the first teacher data to modify its output of the causative signal (the feedback control unit is inactivated if the running condition of the machine deviates from a stable running condition); and (c) an anticipatory control unit for providing second teacher data to the model-based control unit. The anticipatory control unit comprises: (i) a deviation detection program programmed to determine whether the running condition of the machine deviates from a predetermined stable running condition, output from which program is provided to the feedback control unit; and (ii) a compensation formulation program programmed to formulate anticipatory compensations to compensate for deviation of the machine from the predetermined stable running condition based on feedback information received from the machine, output from which program is provided to the model-based control unit as second teacher data, wherein the model-based control unit undergoes learning using the second teacher data to modify output of the causative signal.

According to the present invention, the anticipatory learning method in feed-forward control using control logic (or computer simulation or map) capable of learning allows quick and accurate learning of a feed-forward model of a machine, even if a stable running condition of the machine does not continue long enough for completing feedback control to compensate for deviation of the machine from the model. That is, even if a stable running condition of the machine is very short, or while the machine is actually in operation, feed-forward control based on the model can be performed by timely compensation for deviation of the machine from the model. Unlike conventional model-based control, it is not necessary to wait until compensation values by feedback control are stabilized to obtain teacher data. According to the present invention, the machine can be controlled without deviation by quickly coping with deviation of the machine.

Another important aspect of the present invention, which exhibits the above advantageous effects, is to provide a method for controlling an unstable running condition of a machine which is operable by a causative signal and the performance of which is indicatable by an indicative signal. The method is achieved using a control system comprising: (i) a mode-based control unit for outputting an estimated value of a causative signal when receiving an indicative signal, wherein the input-output relationship of the model-based control unit is the inverse of that of the machine, which model-based control unit receives a target value of the indicative signal and is provided with a learning function which modifies output from the model-based control unit based on teacher data; and (ii) a feedback control unit for providing first teacher data to the model-control unit, which feedback control unit receives feedback information of an actual value of the indicative signal from the machine, and provides the feedback information to the model-based control unit as first teacher data. The method comprises the steps of: (a) providing the feedback information as first teacher data to the model-control unit from the feedback control unit, wherein the model-based control unit undergoes learning using the first teacher data to modify its output of the causative signal; (b) determining whether the running condition of the machine deviates from a predetermined stable running condition; (c) inactivating the feedback control unit when the running condition of the machine deviates from a stable running condition; (d) formulating anticipatory compensations to compensate for deviation of the machine from the predetermined stable running condition based on feedback information received from the machine; and (e) providing the anticipatory compensations to the model-based control unit as second teacher data, wherein the model-based control unit undergoes learning using the second teacher data to modify output of the causative signal.

Preferably, in the above, the feedback information received in step (d) is previous feedback control patterns. The feedback information received in step (d) can be information from the feedback control unit when the feedback control unit is inactivated. Further, the model-based control unit may comprise: a forward model or map defining and simulating the input-output relationship of the machine, wherein the model or map outputs an estimated value of the indicative signal when receiving a causative signal, which forward model is provided with the learning function; and a feedback controller for outputting the estimated value of the causative signal when receiving and comparing the target value of the indicative signal and the estimated value of the indicative signal from the forward model or map, output from which feedback controller is provided to the forward model unit; wherein the model-based control unit outputs the estimated value of the causative signal when receiving the target value of the indicative signal.

In the above, preferably, the previous feedback control patterns are stored in a memory, and based on the previous feedback control patterns, the second teacher data are increased or decreased in a direction compensating for the deviation of the machine. The information obtained when the feedback control unit is inactivated can be the duration of the stable running condition of the machine or the sum of the compensations by the first teacher data from when the feedback control unit is activated.

BRIEF DESCRIPTION OF THE DRAWINGS

FIG. 10($a$) shows a case when deviation is large, and FIG. 10($b$) shows a case when deviation is small.

FIG. 11($a$) shows a case when deviation is large, and FIG. 11($b$) shows a case when deviation is small.

DETAILED DESCRIPTION OF THE PREFERRED EMBODIMENT

The present method of feed-forward control using a control logic model (or map) capable of learning linked with anticipatory control will be explained further with reference to an embodiment. In the embodiment, the subject to be controlled is an engine installed in vehicles or vessels, and parameters for controlling the engine are used. However, in the feed-forward control system of the present invention, no restriction is imposed on the type of machine to be controlled, and as with the engine, a robot used in machine tools, a motor used in electrically-driven vehicles, or the like can be controlled by adopting feed-forward control capable of learning based on the same principle as in the engine.

Engine Control System

FIGS. 1–8 show embodiments of air-fuel ratio control of an engine to which the feed-forward control system using a control logic model (or map) capable of anticipatory learning (hereinafter referred to as "anticipatory learning system") is applied.

Figure 1:
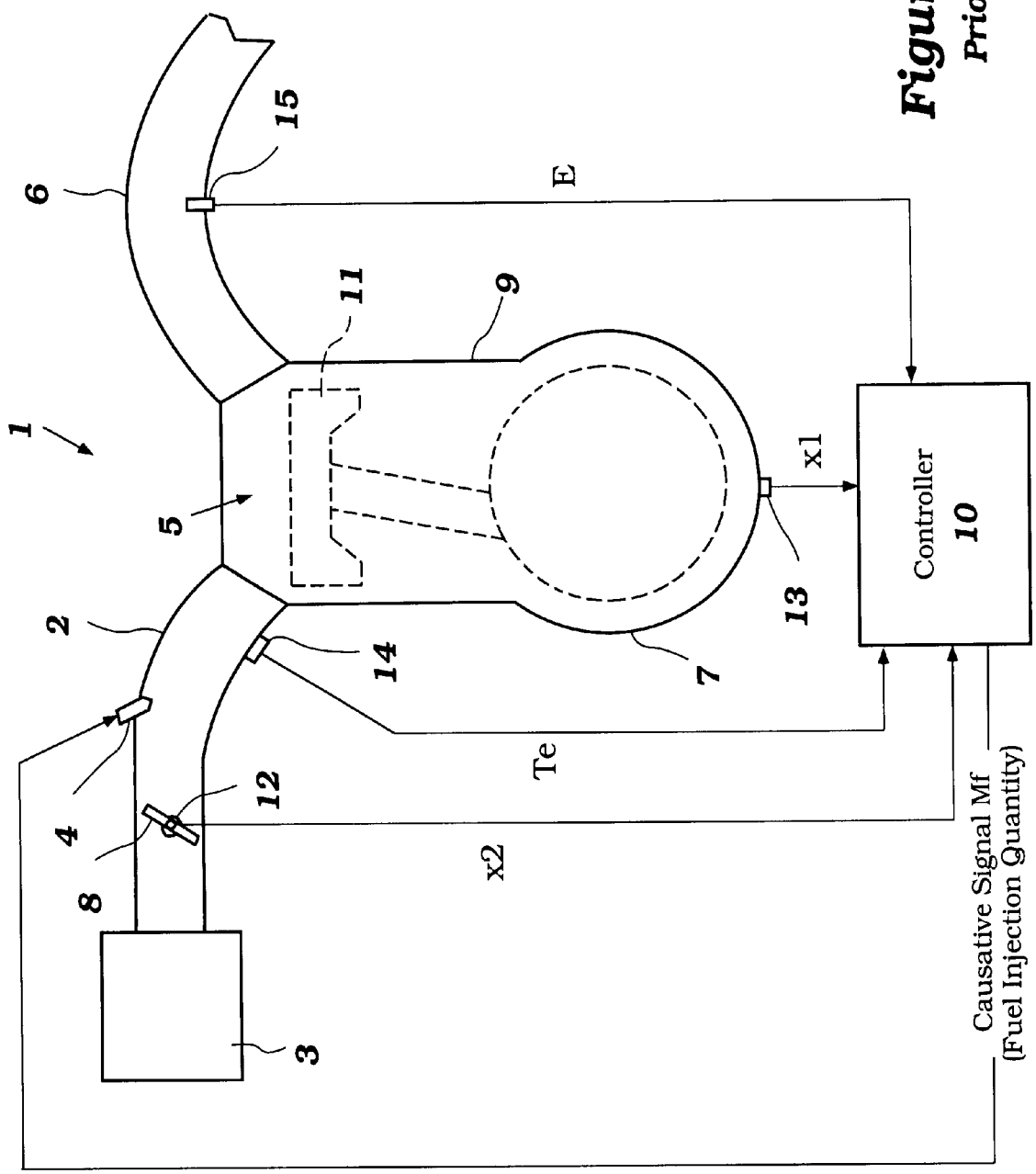
FIG. 1 shows a diagram of an engine control system having an anticipatory learning system of the present invention, which engine control system is installed in vehicles or vessels.

FIG. 1 shows a diagram of an engine control system having an anticipatory learning system of the present invention, which engine control system is installed in vehicles or vessels, wherein the relationship between an engine 1 and a controller 10 for operating an engine control system is illustrated. This system is for controlling air-fuel ratio A/F of the engine 1 at a desired value.

In a cylinder 9 of the engine 1, a piston 11 is placed in a reciprocally-movable way. The piston 11 is connected to a crank shaft via a connecting rod, and the crank shaft rotates as the piston 11 reciprocates. A crank case 7 of the engine 1 is provided with a sensor 13 which detects the crank angle and transmits the information (signal x1) to a controller 10. In a combustion chamber 5 formed in the cylinder 9 of the engine 1, an exhaust pipe 6 and an intake pipe 2 which are communicated to each other, are formed. Air is sucked into the intake pipe 2 through an air filter 3. A throttle 8 is provided in the intake pipe 2. The intake of air is controlled by the throttle 8, and the opening of the throttle 8 is sensed by a throttle-opening sensor 12 which transmits a signal of the throttle angle (signal x2) to the controller 10. An injector 4, which injects fuel, is provided in the intake pipe 2 downstream of the throttle 8. In addition, in the intake pipe 2, a temperature sensor 14 for sensing the wall temperature is provided and transmits a signal Te to the controller 10. The controller 10 receives the signal x2 of the throttle angle, the signal x1 of the crank angle, and the signal Te of the wall temperature, and based on the above input information, the controller 10 determines and outputs a fuel injection actuating value Mf (i.e., fuel injection quantity) to the fuel injector 4. In addition, in the exhaust pipe 6, an oxygen sensor 15 is provided which transmits a signal (signal E) representing the actual air-fuel ratio to the controller 10, and as necessary, the signal E of the air-fuel ratio is used to compensate for output from an internal model (or map) constituted by the above information, as well as to undergo learning of the internal model (or map), thereby constantly optimizing control. In the above, Mf (fuel injection quantity) is an actuating parameter which actuates the machine (engine). In other words, Mf is a causative signal of the machine. On the other hand, E (air-fuel ratio) is a controlled variable which indicates resulting performance of the machine (engine). In other words, E is an indicative signal of the control result. Hereinafter, for a easy understanding, the terms "causative signal" and "indicative signal" are used.

Figure 2:
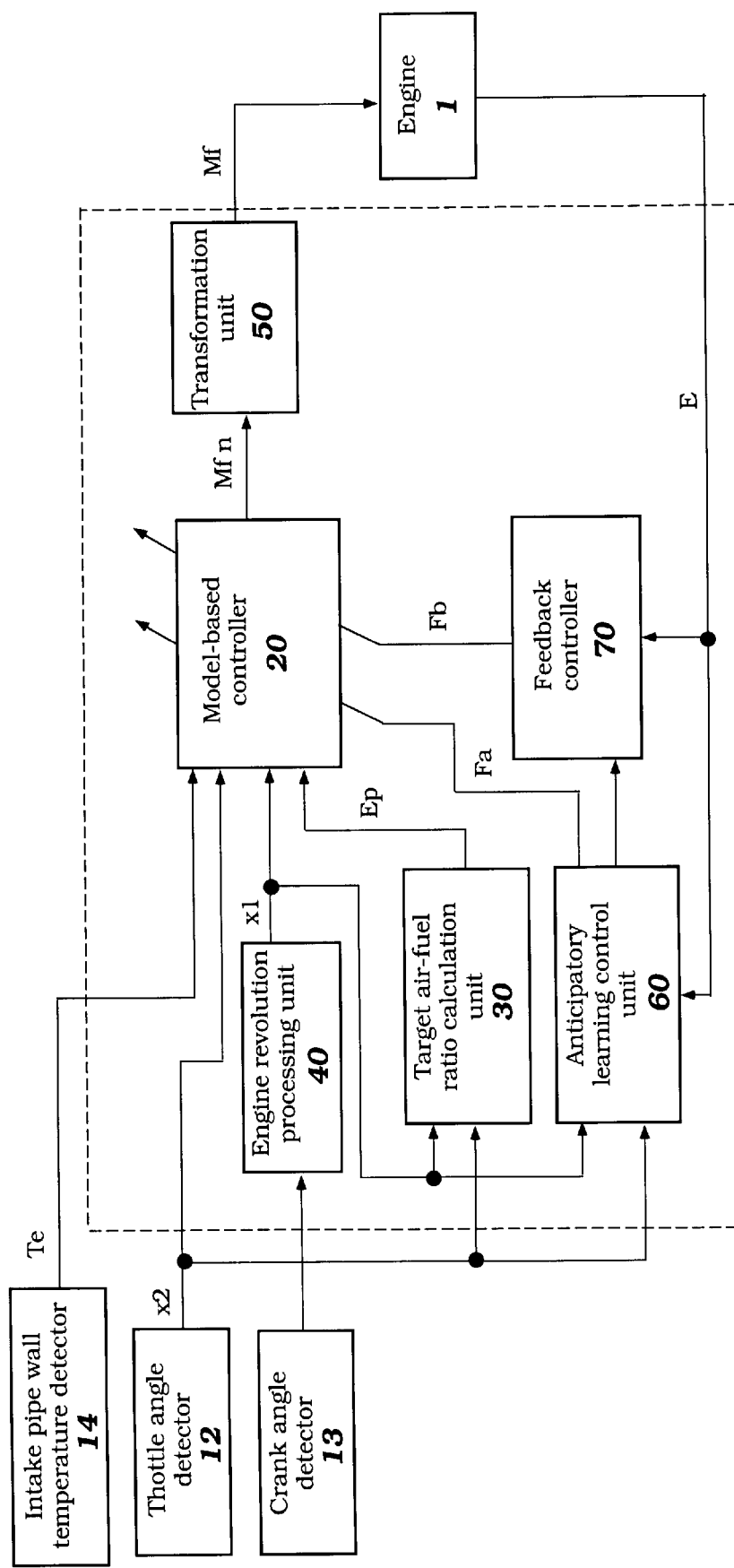
FIG. 2 shows a block diagram of control operated by the controller 10.

FIG. 2 shows a block diagram of control operated by the controller 10. The controller 10 comprises three signal flows: The first is a normal control mode wherein a model-based controller 20 is used. The model-based controller 20 determines a causative signal Mf (fuel injection quantity) by using a feed-forward control logic in accordance with a target air-fuel ratio Ep which is outputted from a target air-fuel ratio calculation unit 30. This is defined as a feed-forward model because this model receives an indicative signal (Ep) determined by running conditions of the engine 1 and outputs a causative signal base (Mfn) by using a control logic. The input-output relationship of the model is the inverse of that of the actual machine (engine). In the above, fuel injection quantity Mfn is transformed to usable actual signal Mf at a transformer unit 50 upstream of the engine 1. The second is a feedback compensation mode comprising the model-based controller 20 and a feedback controller 70, wherein the actual air-fuel ratio (indicative signal) E outputted from the oxygen sensor 15 is fed back to the feedback controller 70, and while conducting feedback control, teacher data Fb are produced at the feedback controller 70. The teacher data Fb are provided to the model-based controller 20. The model-based controller 20 has a learning function, and undergoes learning based on the teacher data to update behavior of the model-based controller 20. The third is an anticipatory learning mode comprising the model-based controller 20, the feedback controller 70, and an anticipatory learning controller 60, wherein the anticipatory learning controller 60 anticipates deviation of the engine 1 and, based on the anticipated deviation obtained in association with the feedback controller 70, the anticipatory learning controller 60 obtains presumed teacher data Fa which are provided to the model-based controller 20 for anticipatory learning. The feedback controller 70 is activated by a signal outputted from the anticipatory learning controller 60. The controller 10 can use any one of the first, second, and third control modes. In the above, the model-based controller 20 receives signals indicating running conditions of the engine 1. Here, the model-based controller 20 receives signal Te from the intake pipe wall temperature sensor 14, signal x2 from the throttle angle sensor 12, and signal x1 derived from the signal outputted from the crank angle sensor 13 via an engine speed determination unit 40, in addition to signal Ep (indicative signal) from the target air-fuel ratio calculation unit 30. Further, signals x1 and x2 are also inputted to the target air-fuel ratio calculation unit 30, and the anticipatory learning controller 60 for their estimation. The signals to be used are not limited to the above. The model-based controller 20 can receive any indicative signal and other signals representing running conditions sufficient for model control, and can output any causative signal, depending on the type of machine.

Model-Based Controller

Hereinafter, the structures of the model-based controller 20 will be explained in detail with reference to FIGS. 3 to 5. The model-based controller includes a control logic model of the machine to be controlled (here, an engine). The control logic model is a computer model of the machine. In principle, this model receives an indicative signal (here, an air-fuel ratio) and outputs a causative signal (here, fuel injection quantity). Thus, the model is an inverse model (the input-output relationship is the inverse of that of the machine). As explained below, the inverse model can be constituted using forward model(s) with feedback control. A forward model of the machine (or a forward model of part of the machine) can be simply a computer simulation of the subject, which can be constituted by control logic. Control logic to be used depends on the type of machine.

In the above, instead of the above forward model, a map, such as a three-dimensional map, which defines engine speed, throttle angle (or intake negative pressure), and fuel quantity, can be prepared for each target air-fuel ratio, thereby estimating fuel quantity. As with the forward model, the map can be provided with a learning function and can be modified by learning. In the present invention, any means which can be constituted by control logic can be used for the above purpose, and hereinafter the model is interchangeable with the map.

Figure 3:
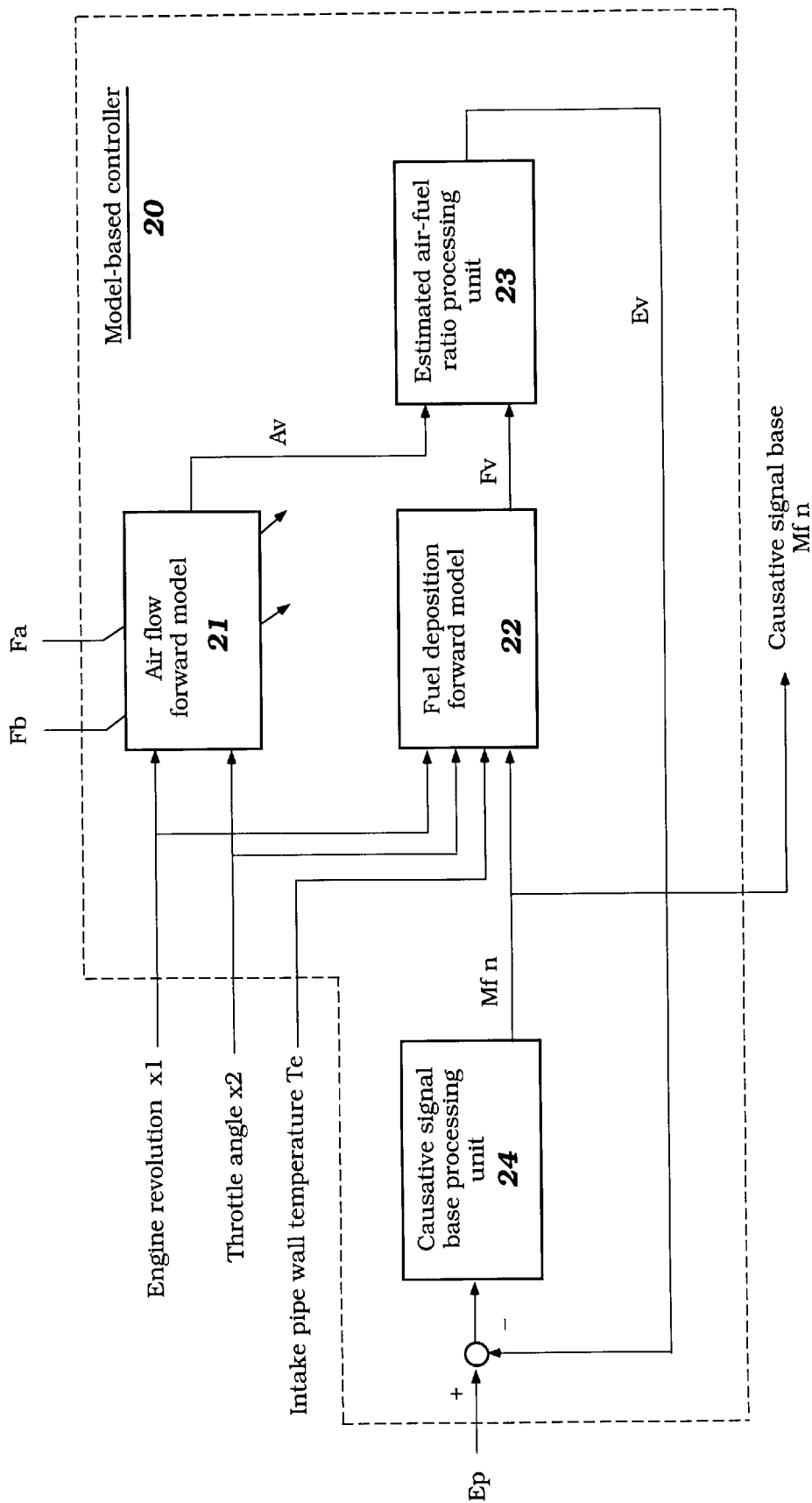
FIG. 3 is a schematic block diagram showing the structures of the model-based controller 20 illustrated in FIG. 2.

FIG. 3 is a schematic block diagram showing the structures of the model-based controller 20 illustrated in FIG. 2. The model-based controller 20 comprises an air flow forward model 21 which is constituted by modeling air flow behavior in the intake pipe 2, a fuel deposition forward model 22 which is constituted by modeling deposition behavior of fuel injected by the fuel injector 5, and an estimated air-fuel ratio processing unit 23 which calculates an estimated air-fuel ratio Ev (indicative signal) based on an estimated air flow Av outputted from the air flow forward model 21 and an estimated fuel quantity Fv outputted from the fuel deposition forward model 22.

In addition, the model-based controller 20 comprises a feedback loop wherein the estimated air-fuel ratio Ev outputted from the estimated air-fuel ratio processing unit 23 is fed back to a causative base signal processing unit 24. At the causative signal base processing unit 24, the estimated air-fuel ratio Ev and the target air-fuel ratio Ep are inputted to calculate the causative signal base Mfn (fuel injection quantity base) for the fuel injector 4 of the engine 1. This causative signal base Mfn is also inputted into the fuel deposition forward model 22 while outputted from the model-based controller 20.

As described above, the model-based controller 20 is constituted by a forward model of the engine 1, which comprises the air flow forward model 21, the fuel deposition forward model 22, and the estimated air-fuel ratio processing unit 23, and a forward model of the engine 1, which performs feedback of the estimated air-fuel ratio Ev outputted from the forward model of the engine 1, using the feedback loop comprising the fuel deposition forward model 22, the estimated air-fuel ration processing unit 23, and the causative signal base processing unit 24, thereby outputting the causative signal base Mfn upon receiving the estimated air-fuel ratio Ev and the target air-fuel ratio Ep at the causative signal base processing unit 24. As described above, the model-based controller 20 is constituted by an inverse model of the engine 1.

In the above, as described later, signal x1 of engine speed, signal x2 of throttle angle, and signal Te of intake pipe wall temperature are inputted into the fuel deposition forward mode 22. Similarly, signal x1 of engine speed and signal x2 of throttle angle are inputted into the air flow forward mode 21. Further, feedback signals Fa and Fb are inputted to the air flow forward model 21 as teacher data. These forward models can be constituted by selecting proper signals, depending on the type of machine.

Fuel Deposition Forward Model

Figure 4:
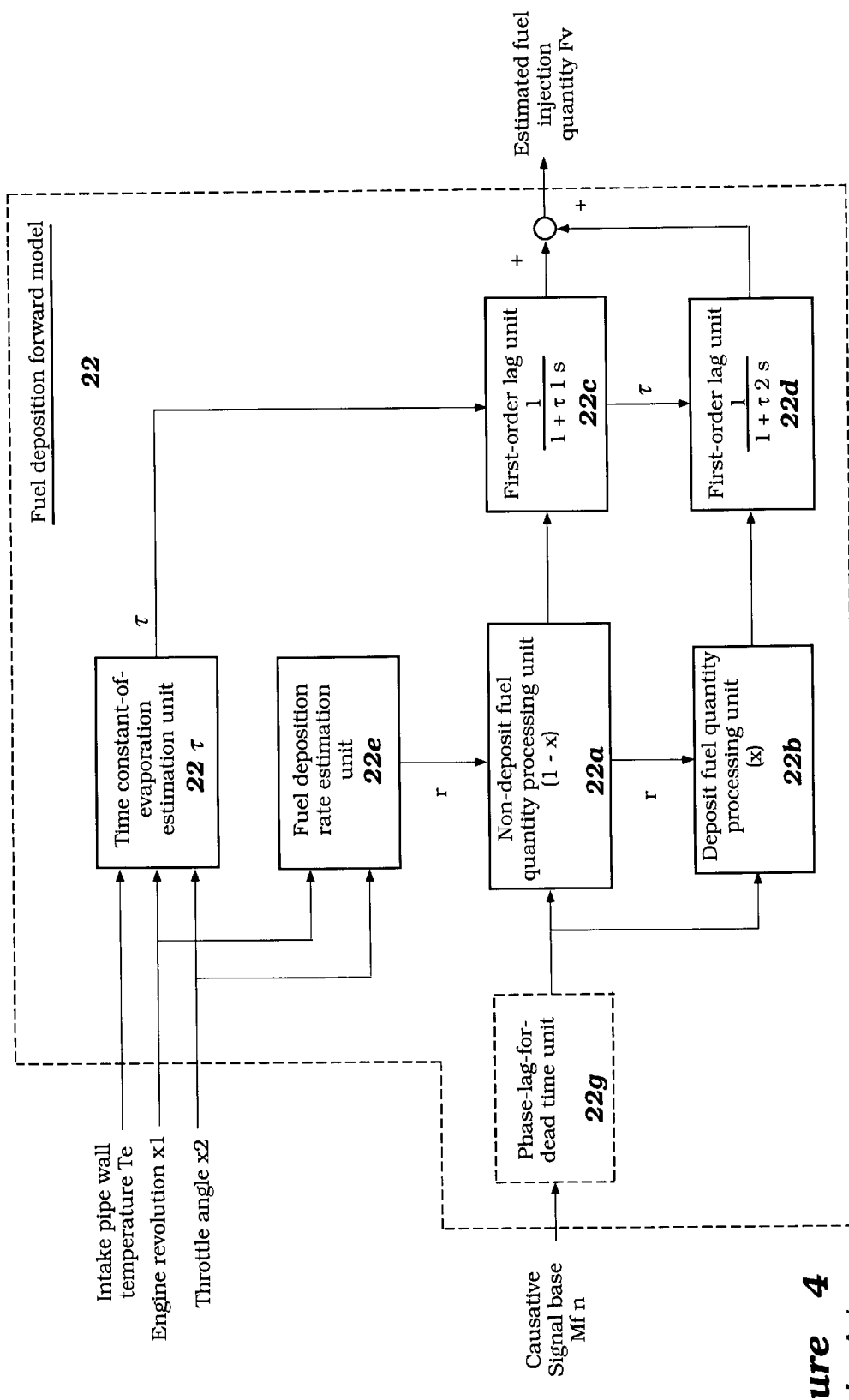
FIG. 4 is a schematic block diagram showing the structures of the fuel deposition forward model 22.

FIG. 4 is a schematic block diagram showing the structures of the fuel deposition forward model 22. This fuel deposition forward model 22 is constituted by modeling the behavior of fuel injected from the fuel injector 4 as described above.

The fuel deposition forward model 22 comprises a non-deposit fuel processing unit 22a, a deposit fuel processing unit 22b, first-order lag units 22c and 22d, a fuel deposition rate estimation unit 22e, and a time constant-of-evaporation estimation unit 22f. The fuel deposition forward model estimates a quantity Fv of fuel actually introduced into the cylinder 9 based on the causative signal base Mfn (fuel injection quantity base) inputted from the aforesaid causative signal base processing unit 24.

The fuel deposition rate estimation unit 22e receives the engine speed signal x1 and the throttle angle signal x2, and based on the above information, estimates the ratio rv (hereinafter referred to as "fuel deposition ratio X") of the fuel deposited on a wall of the intake pipe 2 to the fuel injected by the fuel injector 4. The fuel deposition rate estimation unit 22e is a model constituted by a fuzzy neural network, neural network, or CMAC (cerebellar model arithmetic computer), which has learned the relationship between the engine speed signal x1, the throttle angle signal x2, and the fuel deposition ratio rv. In the above, although not shown in the figure, the fuel deposition rate estimation unit 22e can be constituted to learn in such a way as to compensate for an error of the fuel forward model caused in accordance with changes in time, by inputting teacher data obtained from comparing the target air-fuel ratio Ep and the actual air-fuel ratio when the running conditions of the engine are in a transition state.

The time constant-of-evaporation estimation unit 22f receives the engine speed signal x1, the throttle angle signal x2, and the intake pipe wall temperature Te (or the temperature of engine cooling water), and based on the above information, estimates the time constant-of-evaporation $\tau$. The time constant-of-evaporation estimation unit 22f is a model constituted by a fuzzy neural network, neural network, or CMAC (cerebellar model arithmetic computer), which has learned the relationship between the engine speed signal x1, the throttle angle signal x2, the intake pipe wall temperature Te (or the temperature of engine cooling water), and the time constant-of-evaporation $\tau$. In the above, as with the fuel deposition rate estimation unit 22e, although not shown in the figure, the time constant-of-evaporation estimation unit 22f can be constituted to learn in such a way as to compensate for an error of the fuel forward model caused in accordance with changes in time, by inputting teacher data obtained from comparing the target air-fuel ratio Ep and the actual air-fuel ratio when the running conditions of the engine are in a transition state.

The fuel deposition rate estimation unit 22e and the time constant-of-evaporation estimation unit 22f are explained in detail in U.S. application Ser. No. 08/949,838, filed Oct. 14, 1997, entitled "ENGINE CONTROL SYSTEM USING COMBINATION OF FORWARD MODEL AND INVERSE MODEL", which is hereby incorporated by reference herein.

Based on the fuel deposition rate rv obtained at the fuel deposition rate estimation unit 22e, the non-deposit fuel processing unit 22a determines the quantity of fuel introduced directly to the combustion chamber 5 of the cylinder 9 from the fuel injector 4 at causative signal base Mfn (i.e., fuel injection quantity base) inputted from the aforesaid causative signal base processing unit 24.

Based on the fuel deposition rate rv obtained at the fuel deposition rate estimation unit 22e, the deposit fuel processing unit 22b determines the quantity of fuel, which is introduced to the combustion chamber 5 of the cylinder 9 from the fuel injector 4 after being deposited once on the wall at causative signal base Mfn (i.e., fuel injection quantity base). The causative signal base Mfn has been inputted from the aforesaid causative signal base processing unit 24.

The fuel quantity obtained by the non-deposit fuel processing unit 22a and the deposit fuel processing unit 22b can be treated as a first-order lag system based on the time constants of evaporation $\tau 1$ and $\tau 2$ obtained from the time constant-of-evaporation estimation unit 22f, and then summed to output it as the estimated fuel quantity Fv from the fuel deposition forward model 22.

In the above, when modeling the behavior of fuel injected by the fuel injector 4 of the engine 1, a phase-lag unit for dead time 22g is normally necessary, as indicated in FIG. 4 with the broken line, to cause a phase lag to a degree corresponding to the dead time, by taking into consideration the dead time which is the time for the injected fuel to move from the fuel injector device 4 to the cylinder 9. However, in this embodiment, by causing a phase-lag in the fuel deposition forward model to a degree corresponding to the dead time, the need of the phase-lag unit for dead time 22g can be eliminated. Accordingly, the fuel deposition forward model 22 becomes a simple first-order lag system, and thus, when performing feedback control using output of the fuel deposition forward model 22, a large feedback gain can be used, thereby constituting an accurate inverse model which provides appropriate basic operation value even during a transition state.

Air Flow Forward Model

Figure 5:
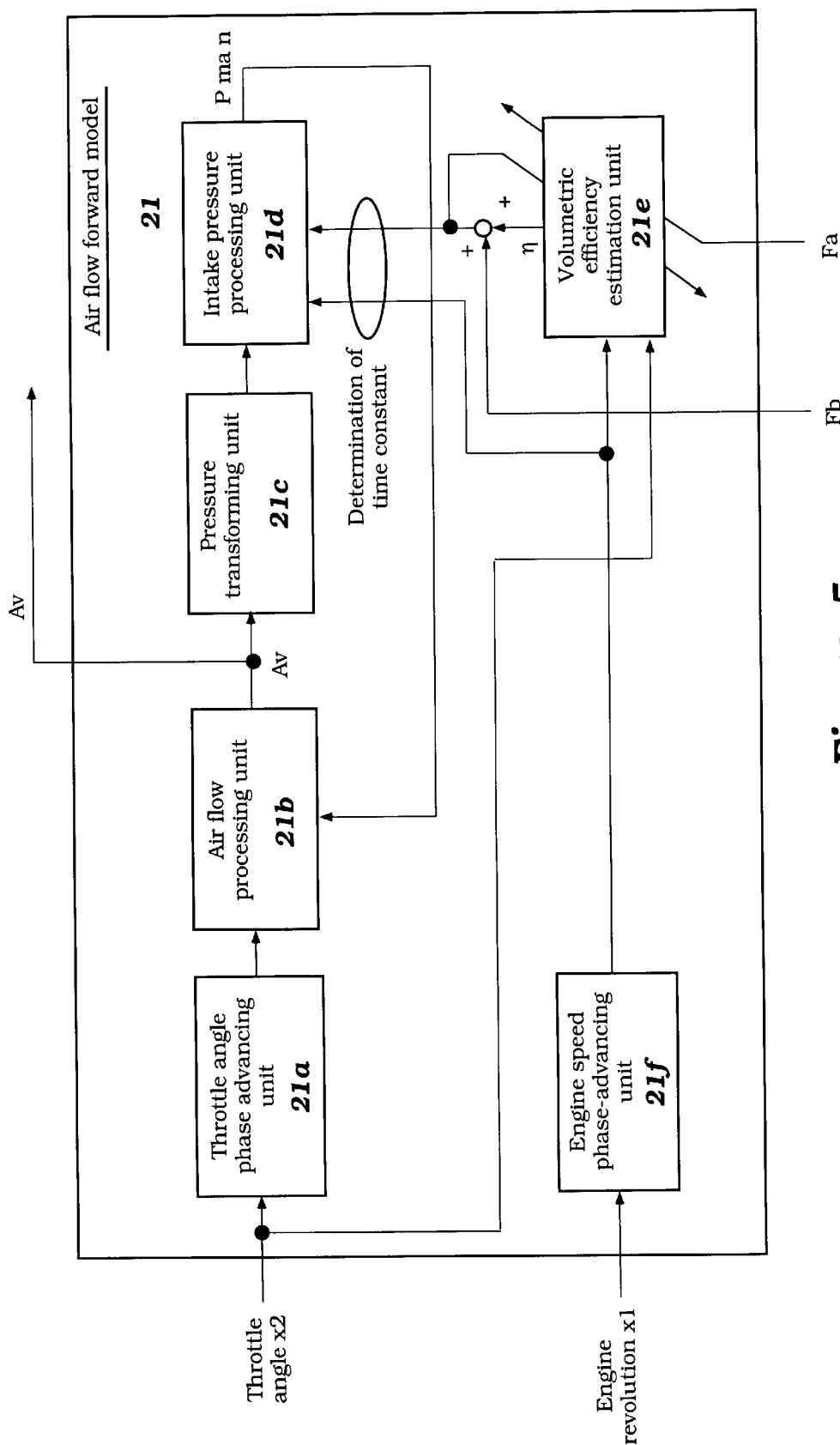
FIG. 5 is a schematic block diagram showing the structures of the air flow forward model 21.

FIG. 5 is a schematic block diagram showing the structures of the air flow forward model 21.

This air flow forward model comprises a phase-advance unit 21a for throttle angle, an air flow processing unit 21b, a pressure transforming unit 21c, an intake pressure processing unit 21d, a volumetric efficiency processing unit 21e, and a phase-advance unit 21f for engine speed.

Phase-Advance Units

At the phase-advance unit 21a for throttle angle and the phase-advance unit 21f for engine speed, the phases of the throttle angle signal x2 and the engine speed signal x1 are moved forward to a degree corresponding to the dead time (i.e., the time for the injected fuel to move from the fuel injector 4 to the cylinder 9) which has been eliminated at the fuel deposition forward model 22. That is, each of the phase-advance units 21a and 21f is provided with a neural network which completes learning, changing patterns of the engine speed, or the throttle angle, in relation to time. Using this neural network, the phase is advanced by determining a future value of the engine speed and the throttle angle based on the engine speeds and the throttle angles at plural times in the past.

As described above, in the air flow forward model 21, the phases of the throttle angle and the engine speed are advanced to a degree corresponding to the dead time, meaning that the phases of the fuel deposition forward model 22 and the air flow forward model 21 are advanced to a degree corresponding to the dead time, thereby eliminating the discrepancy in the phase between the estimated fuel quantity Fv and the estimated air flow Av, which discrepancy has been created at the fuel deposition forward model 22. Thus, it is possible to estimate an appropriate estimated control value. In addition, for example, when modeling the behavior of injected fuel in an engine, which causes no dead time for the injected fuel to move from the fuel injector to the cylinder or causes dead time so short that it can be ignored, such as a type of engine which injects fuel inside the cylinder, it is not necessary to use the phase-lag unit for dead time. That is, it is not necessary to use the phase-advance units 21a and 21f.

In the above, a method of advancing the phase can be achieved not only by the neural network, but also by a method of least squares.

Because the volumetric efficiency η cannot be modeled using equations, the volumetric efficiency η is modeled using a fuzzy neural network (or neural network or CMAC) at the volumetric efficiency estimation unit 21e, which network uses the engine speed and the intake pressure as input data.

The air flow Av and the intake pressure Pman are modeled using fluid mechanics equations (1) and (2).

$$\text{Air Flow Av }(\alpha, \text{Pman}) = (Ct(\pi/4)D^2(\text{Pamb}\sqrt{k})/(\sqrt{(\text{PTamb})}))\beta_1(\alpha)\beta_2(\text{Pman}) + \text{Mao} \quad (1)$$

$$\text{Intake Pressure} = \text{Pman} = (-1/\tau)(\text{Pman}(\text{RTman}/V))\text{Av}(\alpha, \text{Pman}) \quad (2)$$

In the above, Ct is a flow measured at the throttle, D is the diameter of the throttle, Pamb is the ambient pressure, k is the specific heat of air, Tamb is ambient temperature, R is a gas constant, Mao is a compensation, Pman is the intake pipe pressure (intake negative pressure), Tman is temperature of the intake pipe, V is volume of the intake pipe, $\beta_1$ is a coefficient depending on the throttle angle, $\beta_2$ is a coefficient depending on the intake pipe pressure.

Fuzzy Neural Network for Volumetric Efficiency Estimation Unit

Figure 6:
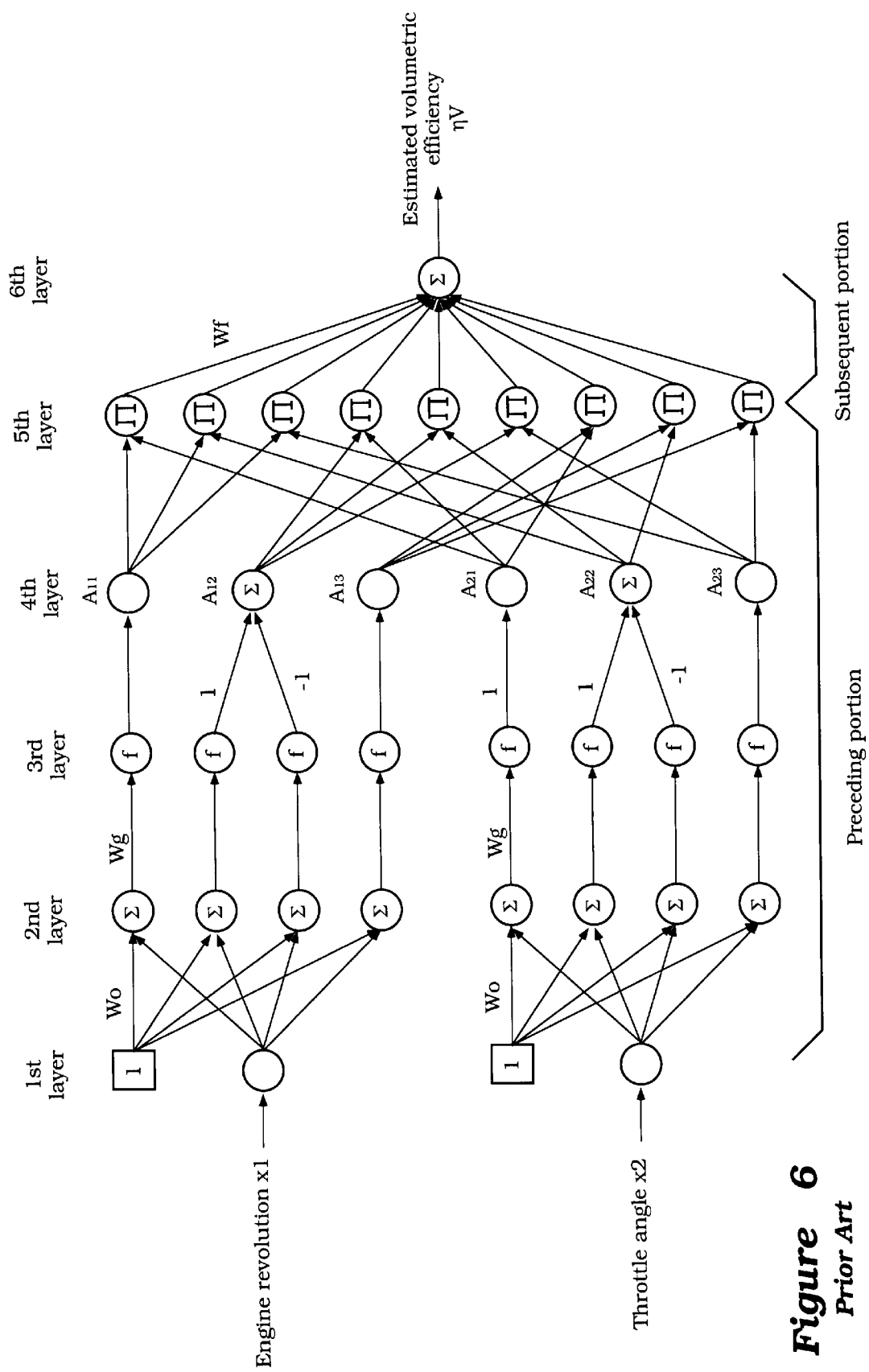
FIG. 6 is a schematic diagram showing a fuzzy neural network for determining the volumetric efficiency η.

FIG. 6 is a schematic diagram showing a fuzzy neural network for determining the volumetric efficiency η.

As shown in this figure, the fuzzy neural network is for determining the volumetric efficiency η and comprises a hierarchical fuzzy neural network composed of six layers, wherein layers from a first layer through a fourth layer constitute a first-half portion (preceding portion), and layers from a fifth layer to a sixth layer constitute a second-half portion (subsequent portion).

In this embodiment, at the preceding portion, an engine speed x1 and a throttle angle x2 each have three membership functions, A11, A12, A13, A21, A22, and A23, and input domains at the subsequent portion (i.e., input at the fifth layer) are divided into 9 fuzzy rule domains (3×3=9).

In FIG. 6, "wc", "wg", "wf", and "−1" indicate coupling loads between units represented by circles. The units represented by squares at the first layer indicate bias units which constantly output value 1 (one).

Each of the units at the third layer has the following sigmoid function which constitutes membership functions at the first-half portion:

$$f(x) = 1/(1 + \exp(-x))$$

In this network structure, to the engine speed x1 and the throttle angle x2 inputted into the respective units at the first layer, coupling load wc is added as a bias at the second layer. Input of each unit at the third layer is obtained by multiplying the corresponding output of the unit at the second layer by wg. Thus, the output of the unit at the third layer is expressed as follows:

$$f(x) = 1/(1 + \exp(-wg(xi + wc)))$$

In the above, xi is x1 or x2. The coupling loads wg and wc are parameters for determining the inclination and the central value of the sigmoid function. The coupling loads wg and wc are set at appropriate values for each sigmoid function, as a result of learning.

Accordingly, as output of the fourth layer, membership functions A11, A12, A13, A21, A22, and A23 can be obtained at the preceding portion, which cover certain ranges of engine speeds and throttle angles.

In the above, membership functions A11, A12, and A13 denote that the engine speed is in a "low range", "intermediate range", and "high range", respectively. Conditions A21, A22, and A23 denote that the throttle opening is "small", "intermediate", and "large", respectively.

In this example, at the subsequent portion, nine fuzzy rules (3×3=9) are generated, and at the fifth layer, adaptability for each fuzzy rule is calculated based on the grade of the membership functions at the preceding portion.

The fuzzy rules are determined for each combination of the membership function of the engine speed at the preceding portion and the membership function of the throttle angle at the preceding portion as follows: "if engine speed x1 is membership function A1n (n=1–3) at the preceding portion, and throttle angle x2 is membership function A2n (n=1–3), then volumetric efficiency is coupling load wf." That is, coupling load wf is a parameter which indicates output of the fuzzy rule. Coupling load wf is set at an appropriate value through learning, e.g., "when engine speed x1 is in a high range, and throttle opening x2 is intermediate, fuel deposition rate wf is 50%," or "when engine speed x1 is in a low range, and throttle opening x2 is small, fuel deposition rate wf is 70%." At the sixth layer, the sum of adaptability for each fuzzy rule at the preceding portion, which is calculated at the fifth layer, and coupling load wf, which means output of the fuzzy rule, is integrated. This integrated sum is an estimated value of volumetric efficiency ηv based on weighted means method.

As described above, the volumetric efficiency estimation unit 21e is constituted in such a way as to be capable of learning in order to compensate for deviation between the model and the actual subject to be controlled (engine), based on the anticipatory learning controller 60 or the feedback controller 70.

In practice, at the feedback controller 70, teacher data are obtained based on actually measured values, whereas at the anticipatory learning controller 60, presumed teacher data are obtained based on anticipated values. By using either, the volumetric efficiency estimation unit 21e undergoes learning of coupling load wc or wg at the preceding portion or coupling load wf at the subsequent portion.

Further, as shown in FIGS. 3 and 5, the anticipatory learning controller 60 directly outputs presumed teacher data. In contrast, the feedback controller 70 outputs a compensation value for the estimated volumetric efficiency ηv which is output from the volumetric efficiency estimation unit 21e, thereby using the presumed volumetric efficiency ηv' after the compensation.

Anticipatory Learning Control Mode

In the anticipatory learning control mode, the model-based controller 20, the feedback controller 70, and the anticipatory learning controller 60 are used. The processes in the anticipatory learning mode will be further explained with reference to FIG. 7 which is a schematic flow chart illustrating an example of the anticipatory learning control mode according to the present invention.

The anticipatory learning controller 60 receives the engine speed signal x1 and the throttle angle signal x2, and determines whether the running conditions of the engine are in a stable state based on respective fluctuations $_\Delta$x1 and $_\Delta$x2 (step 1). In practice, in this embodiment, the running conditions of the engine are determined to be stable if fluctuation $_\Delta$x1 of engine speed is 300 r.p.m. or less and fluctuation $_\Delta$x2 of throttle angle is 1 (one) degree or less. If the running conditions of the engine are considered to be stable, step 2 is activated.

In step 2, it is observed or checked whether the stable state of running conditions detected in step 1 is consistent with the actually outputted indicative signal (air-fuel ratio), i.e., whether the air-fuel ratio is in a stable state. In practice, the air-fuel ratio is determined to be stable if the aforesaid stable state of running conditions continues for a predetermined period of time (in FIG. 7, two seconds). If both running conditions and actual air-fuel are determined to be stable, the subject to be controlled (engine) is judged to be stable, and step 3 is activated.

When the engine is judged to be stable, engine speed x1 and throttle angle x2, and oxygen sensor output E (rich or lean), which are actually detected at the moment, are stored in a memory as feedback information (step 3). A signal for actuating feedback control is then outputted to the feedback controller 70 (step 4).

The feedback controller 70 actuates feedback control in accordance with the feedback actuation signal. In practice, for example, when signal E obtained from the oxygen sensor 15 indicates a rich gas (rich in fuel quantity), a compensation signal Fb is outputted to decrease the presumed volumetric efficiency ηv by a predetermined degree. When signal E obtained from the oxygen sensor 15 indicates a lean gas (lean in fuel quantity), a compensation signal Fb is outputted to increase the presumed volumetric efficiency ηv by a predetermined degree. This feedback control continues until signal E is cyclically reversed (i.e., until gas is cyclically changed between "rich" and "lean"). If cyclic changes are detected, the compensation based on the feedback control is determined to be settled and stabilized (step 6). The presumed volumetric efficiency ηv after compensation is obtained as teacher data (step 7), and then feedback control is discontinued (step 8). Based on the teacher data, the volumetric efficiency estimation unit 21e begins learning (step 9).

While the feedback controller 70 performs the above, the anticipatory learning controller 60 continues checking whether the stable state is maintained (step 5). If the engine deviates from the stable state during the feedback control, the feedback information stored in the memory in step 3 is retrieved to form presumed teacher data Fa (step 10), and steps 6 and 7 are bypassed.

Formulation of Presumed Teacher Data Fa

Figure 8:
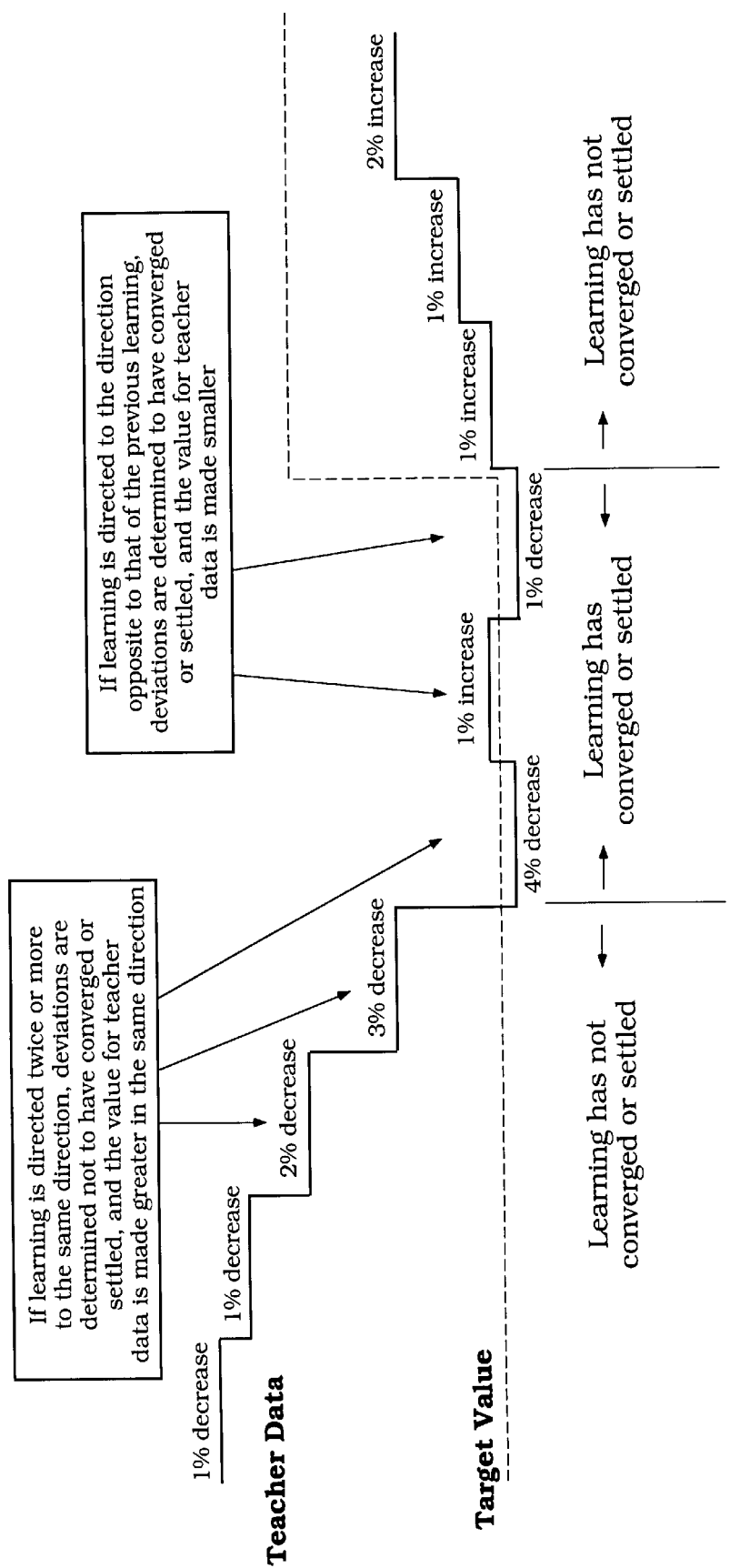
FIG. 8 is a schematic diagram illustrating a first example of formulation of presumed teacher data based on previous learning patterns.

FIG. 8 is a schematic diagram illustrating a first example of formulation of the above-mentioned presumed teacher data.

As shown in FIG. 8, the anticipatory learning controller 60 stores a pattern of anticipatory learning in the past, and formulates presumed teacher data based on the above pattern and the feedback information (actual oxygen sensor output) stored in step 3.

In practice, when the subject to be controlled deviates from a stable running condition (step 5) after initiating feedback control (step 4), the anticipatory learning controller 60 comprises the pattern of the previous learning of the coupling loads in the subsequent portion (or the preceding portion) of the fuzzy neural network for engine speed and throttle angle, which pattern is stored in the memory in step 3, with the feedback information (the oxygen sensor output stored in the memory in step 3). If learning has been conducted at least twice in the same pattern (decrease or increase) at the same coupling loads in the subsequent portion, the value of the teacher data is increased by twice that of the previous value, for example (e.g., if the previous teacher data are for a 1% decrease, the instant teacher data will be for a 2% decrease).

In the above, if there is no previous teacher data, it is determined that this is the first time learning for the subsequent portion coupling loads, and accordingly, if the feedback information (oxygen sensor output) indicates a rich gas, presumed teacher data are formulated to reduce the subsequent portion coupling loads by a predetermined minimum amount (1% in FIG. 8). Based on the presumed teacher data, the volumetric efficiency estimation unit 21e begins learning in the fuzzy neural network (step 9).

If learning for reducing the subsequent portion coupling loads by a minimum amount (1%) has been conducted, presumed teacher data are formulated to reduce the subsequent portion coupling loads by the minimum amount (1%) again. Based on the presumed teacher data, the volumetric efficiency estimation unit 21e begins learning in the fuzzy neural network (step 9).

If learning for reducing the subsequent portion coupling loads by a minimum amount (1%) has been conducted twice in a row, it is determined that the previous teacher data are not sufficient for settling or stabilizing deviation of the machine from the model, and presumed teacher data are formulated to reduce the subsequent portion coupling loads by an amount twice the minimum amount (2%). Based on the presumed teacher data, the volumetric efficiency estimation unit 21e begins learning in the fuzzy neural network (step 9).

The above formulation of presumed teacher data (step 10) and learning (step 9) are conducted whenever step 10 is activated, and if oxygen sensor output indicates the opposite pattern (increase or decrease) to the previous pattern, the value of the presumed teacher data is set at the minimum amount (1%) but in the opposite direction (increase or decrease), thereby undergoing learning.

By formulating presumed teacher data to conduct anticipatory learning, even if actual teacher data obtained by feedback control due to, for example, an unstable or transition state of driving, the model in the volumetric efficiency estimation unit 21e is modified in a direction approaching the target value, eventually settling to the target value.

As described above, by using the anticipatory learning controller 60 and the feedback controller 70, if the machine maintains a stable running condition to a degree that feedback control obtains a compensation value, deviation of the machine from the model in the volumetric efficiency estimation unit 21e can be compensated for by undergoing learning based on teacher data actually obtained through the feedback control. If the machine does not maintain a stable running condition (probably this is a typical situation) so that feedback control cannot obtain a compensation value quickly, deviation of the machine from the model in the volumetric efficiency estimation unit 21e can be presumed based on the feedback information obtained when in a stable running condition. Thus, anticipatory learning can be conducted to compensate for the presumed deviation. Accordingly, even when the machine is in use, e.g., while actually driving a vehicle with the engine installed, the internal model can be modified constantly to function as an optimum model by undergoing learning based on the presumed teacher data.

Figure 7:
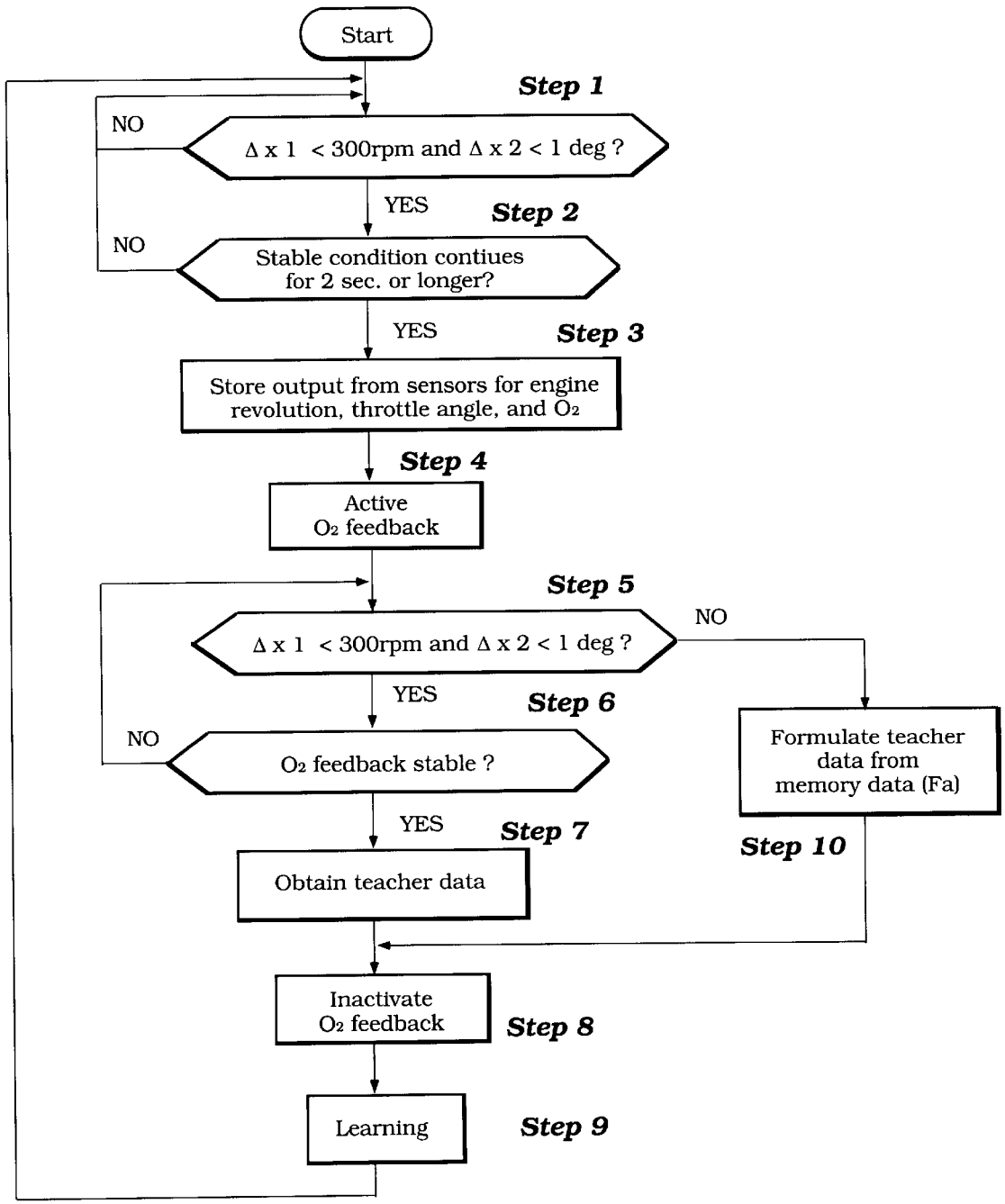
FIG. 7 is a schematic flow chart illustrating an example of the anticipatory learning control mode according to the present invention.

FIGS. 9, 10(a), 10(b), 11(a), and 11(b) are schematic diagrams illustrating other examples of formulation of presumed teacher data at the anticipatory learning controller 60 (step 10 in FIG. 7).

Figure 9:
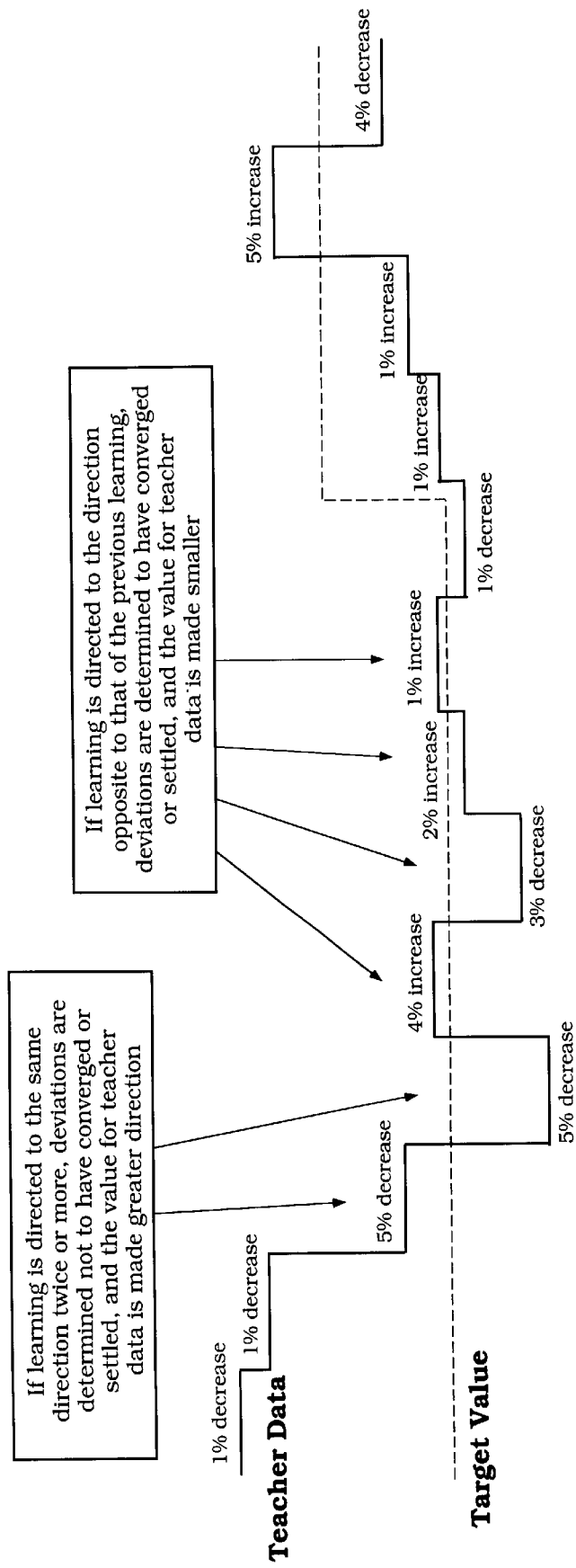
FIG. 9 is a schematic diagram illustrating another example of formulation of presumed teacher data based on previous learning patterns.

In the example shown in FIG. 9, the minimum value (e.g., 1%) and the maximum value (5%) of presumed teacher data are predetermined. If learning is repeated twice at the minimum value in the same direction (increase or decrease), the next teacher data are set for the maximum value. In the above, the maximum value can be the maximum value among those which do not influence running conditions (i.e., the maximum value in a range in which a user or driver cannot notice any change in running conditions).

After setting presumed teacher data at the maximum value, this condition continues until the feedback information (oxygen sensor output) is reversed (increase or decrease). After being reversed, the value of the presumed teacher data is gradually reduced to the minimum value at predetermined rates.

Accordingly, by increasing the value of the presumed teacher data directly from the minimum value to the maximum value, the time required to settle or stabilize deviation of the machine from the model can be shortened as compared with the model shown in FIG. 8.

Figure 10A:
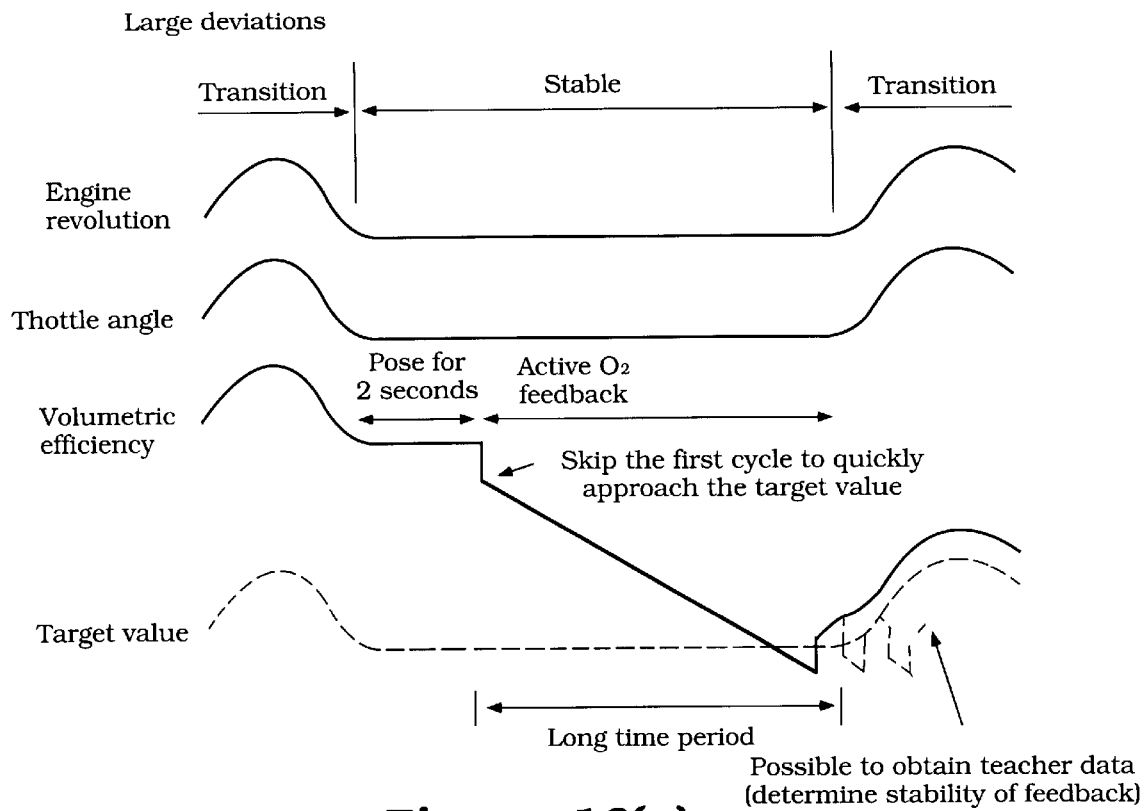
FIGS. 10($a$) and 10($b$) are schematic diagrams illustrating the relationship between the duration of feedback control and the degree of deviation from the target value.
Figure 10B:
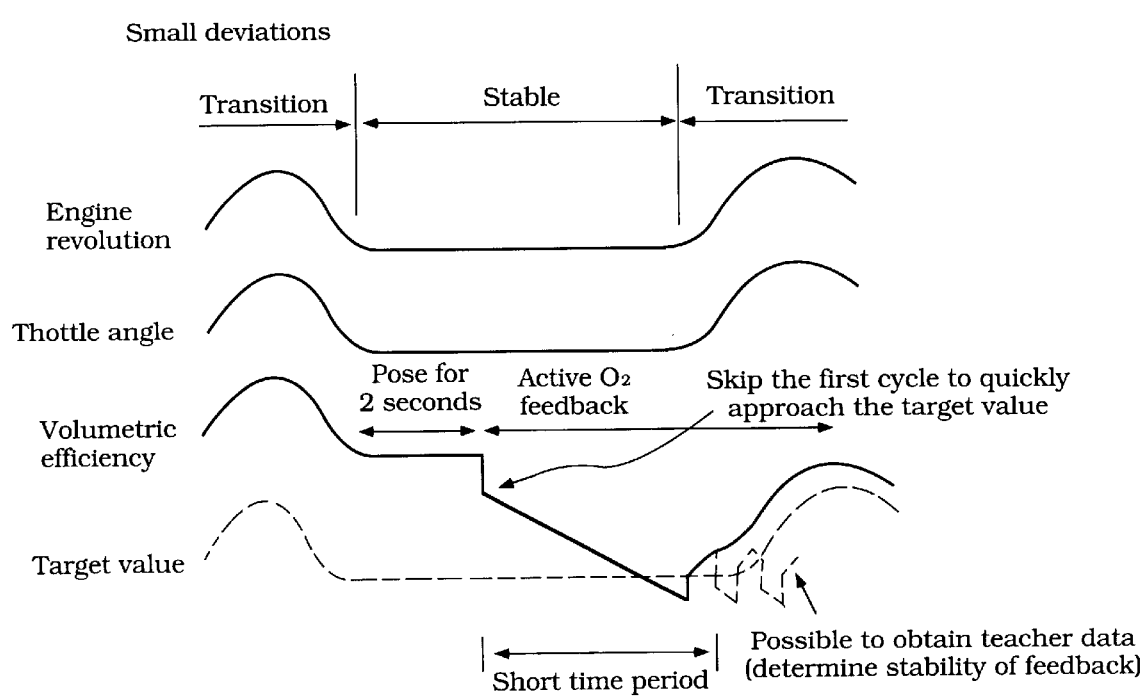

In the example shown in FIGS. 10(a) and 10(b), the anticipatory learning controller 60 formulates presumed teacher data based on feedback information at the feedback controller 70. That is, the relationship between the duration of feedback control and the characteristics of settlement of deviation due to learning is used as feedback information, and presumed teacher data are formulated based on the feedback information.

Namely, in step 4 indicated in FIG. 7, the feedback control is activated, and before settling to a compensation value due to the feedback control, if deviation of the machine from the stable state is detected in step 5 (unstable running of the machine), the time period during which the feedback control lasted is used as feedback information for anticipating deviation of the machine from the model.

As shown in FIG. 10(a), when the time period is long from when the feedback control is activated until the oxygen sensor output is reversed, the compensation value of output from the volumetric efficiency estimation unit 21e is determined to be large. That is, deviation of the machine from the internal model is determined to be large. On the other hand, as shown in FIG. 10(b), when the time period is short from when the feedback control is activated until the oxygen sensor output is reversed, the compensation value of output from the volumetric efficiency estimation unit 21e is determined to be small. That is, deviation of the machine from the internal model is determined to be small. In other words, there is a proportional relationship between (a) the time period until the oxygen sensor output is reversed after the feedback control is activated and (b) the degree of deviation of the machine from the internal model. The anticipatory learning controller 60 uses this information to formulate presumed teacher data. For example, if the deviation is determined to be large, a high value (e.g., 5%) is set for presumed teacher date.

Figure 11A:
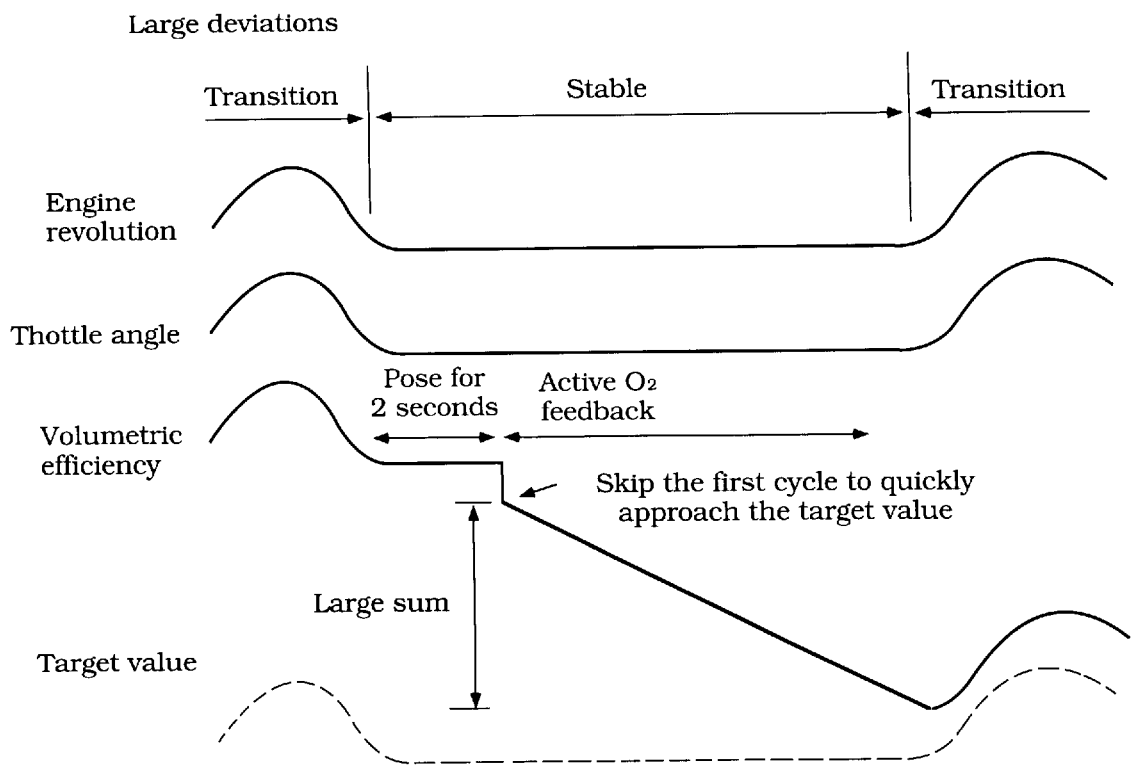
FIGS. 11($a$) and 11($b$) are schematic diagrams illustrating the relationship between the sum of feedback compensations and the degree of deviation from the target value.
Figure 11B:
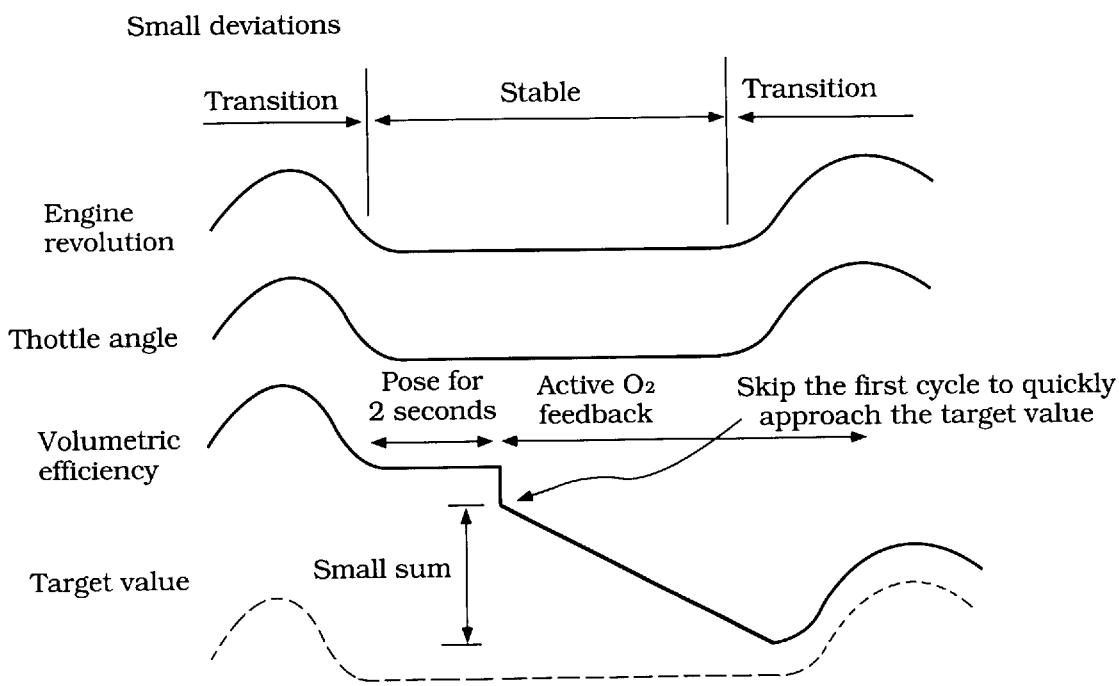

In the example shown in FIGS. 11(a) and 11(b), the anticipatory learning controller 60 formulates presumed teacher data based on feedback information at the feedback controller 70. That is, the relationship between the compensation value via the feedback control and the characteristics of settlement of deviation due to learning is used as feedback information, and presumed teacher data are formulated based on the feedback information.

Namely, in step 4 indicated in FIG. 7, the feedback control is activated, and before settling to a compensation value due to the feedback control, if deviation of the machine from the stable state is detected in step 5 (unstable running of the machine), the sum of compensation values via the feedback control is used as feedback information for anticipating deviation of the machine from the model.

As shown in FIG. 11(a), when the sum of compensation values for the presumed volumetric efficiency is large from when the feedback control is activated until the machine deviates from the stable running conditions, deviation of the machine from the internal model is determined to be large. On the other hand, as shown in FIG. 11(b), when the sum of compensation values for the presumed volumetric efficiency is small from when the feedback control is activated until the machine deviates from the stable running conditions, deviation of the machine from the internal model is determined to be small. That is, there is a proportional relationship between (a) the sum of compensation values for the presumed volumetric efficiency is small from when the feedback control is activated until the machine deviates from the stable running conditions and (b) the degree of deviation of the machine from the internal model. The anticipatory learning controller 60 uses this information to formulate presumed teacher data. If the deviation is determined to be large, a high value (e.g., 5%) is set for presumed teacher date.

In the above, when formulating presumed teacher data, if the oxygen sensor output is reversed even once, the sum used here is the sum of the compensation values for the presumed volumetric efficiency via the feedback control from when the feedback control is activated until the oxygen sensor output is reversed.

By using the methods of formulation of presumed teacher data indicated in FIGS. 10(a) and 10(b) and FIGS. 11(a) and 11(b), data, which are obtainable from the time the feedback control is activated until it is inactivated at the feedback controller 70, are not wasted and are used for formulating more accurate presumed teacher data than that produced by the methods shown in FIGS. 8 and 9.

Other Features

In the above embodiments shown in FIGS. 8, 9, 10(a), 10(b), 11(a), and 11(b), formulation of presumed teacher data is explained separately. However, two or more of these embodiments can be combined to formulate presumed teacher data. For example, if the feedback control continues until the oxygen sensor output is reversed but the compensation values do not converge or settle, presumed teacher data can be formulated according to the methods shown in FIGS. 10(a) and 10(b) or FIG. 11(a) and 11(b). If the feedback control is inactivated before the oxygen sensor output is reversed, presumed teacher data can be formulated according to the methods shown in FIGS. 11(a) and 11(b). Once anticipatory learning is conducted based on the presumed teacher data formulated by the methods shown in FIGS. 10(a) and 10(b) or FIG. 11(a) and 11(b), anticipatory learning based on the presumed teacher data can be conducted by the methods shown in FIGS. 8 and 9. As described above, formulation of presumed teacher data can be achieved in various ways, and the anticipatory learning controller 60 can be constituted accordingly.

Further, methods of formulation of presumed teacher data are not limited to those described above, but can be any method which can achieve the following: (a) feedback control can be conducted based on feedback information of an indicative signal actually detected (e.g., the oxygen sensor output); (b) the feedback control can be inactivated if the running condition of a machine deviates from a stable state; (c) after the feedback control is inactivated, at least either feedback information of an indicative signal actually detected (e.g., the oxygen sensor output) or feedback information obtained when (b) occurs is available; (d) a compensation formulation program is programmed to formulate appropriate compensations to compensate for deviation of the machine from the stable running condition based on the feedback information of (c); and (e) a computer model (inverse model) of the machine is provided, which model is capable of modifying its input-output relationship by learning based on the compensations of (d) as teacher data (presumed teacher data) and on the feedback information of (a) as teacher data (actually detected teacher data).

Although the control systems capable of learning in the model-based controller 20 are the fuzzy neural networks in the aforesaid embodiment, the systems need not be limited thereto, and other neural networks or CMAC (Cerebellar Model Arithmetic Computer), for example, can be used as long as the control systems are capable of learning.

Although engine control over the air-fuel ratio of the engine 1 provided with the fuel injector 4 in the intake pipe 2 has been explained in the aforesaid embodiment, the type of engine is not limited thereto, and various types of engines such as a type of engine which injects fuel inside the cylinder can be employed.

Although control over the air-fuel ratio of the engine 1 has been explained in the aforesaid embodiment, the control value is not limited thereto, and the ignition timing or the valve timing, for example, can be used as a control value.

Further, in the aforesaid embodiments, behavior of fuel injected from the fuel injector 4 is estimated by using two parameters, one being the time constant-of-evaporation, the other being the fuel deposition rate, wherein the fuel forward models, which are modeled by fuzzy neural networks, neural networks, or CMAC, are used. However, alternatively, a three-dimensional map, which defines engine speed, throttle angle (or intake negative pressure), and fuel quantity, can be prepared for each target air-fuel ratio, thereby estimating fuel quantity. Further, an appropriate equation can be used to estimate fuel quantity from the estimated air flow derived from the air flow forward model and the target air-fuel ratio.

In addition, in the aforesaid embodiments, the oxygen sensor, which is a dual-value sensor, is used to obtain feedback data of the indicative signal (air-fuel ratio). However, the sensor is not limited to the above, and a linear sensor such as an air-fuel ratio sensor can be used.

Finally, in the aforesaid embodiments, the anticipatory learning method according to the present invention is adapted to air-fuel control of an engine. However, it is clear that the method is not limited to the above, and can be applied to control of any type of machine as long as the machine is controlled using feed-forward control capable of learning. For example, various applications include a shock absorber of a vehicle, a bicycle equipped with an electric motor or an engine as an auxiliary drive, an electric chair, a wheel chair with an auxiliary drive, an outboard engine, a water vehicle, a crewless helicopter, a personal robot, and so forth.

Effects Exhibited in The Embodiments

As explained above, the anticipatory learning method in feed-forward control using control logic (or computer simulation or map) capable of learning allows quick and accurate learning of a feed-forward model of a machine, even if a stable running condition of the machine does not continue long enough for completing feedback control to compensate for deviation of the machine from the model. That is, even if a stable running condition of the machine is very short, or while the machine is actually in operation, feed-forward control based on the model can be performed by timely compensation for deviation of the machine from the model. Unlike conventional model-based control, it is not necessary to wait until compensation values by feedback control are stabilized to obtain teacher data. According to the present invention, the machine can be controlled without deviation by quickly coping with deviation of the machine.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. A machine control system for controlling performance of a machine which is operable by a causative signal and the performance of which is indicatable by an indicative signal, said control system comprising:

a model-based control unit for outputting an estimated value of a causative signal when receiving an indicative signal, wherein the input-output relationship of the model-based control unit is the inverse of that of the machine, said model-based control unit receiving a target value of the indicative signal and being provided with a learning function which modifies output from the model-based control unit based on teacher data;

a feedback control unit for providing first teacher data to the model-control unit, said feedback control unit receiving feedback information of an actual value of the indicative signal from the machine, and providing the feedback information to the model-based control unit as first teacher data, wherein the model-based control unit undergoes leaning using the first teacher data to modify its output of the causative signal, said feedback control unit being inactivated if the running condition of the machine deviates from a stable running condition; and an anticipatory control unit for providing second teacher data to the model-based control unit, comprising:

a deviation detection program programmed to determine whether the running condition of the machine deviates from a predetermined stable running condition, output from which program is provided to the feedback control unit; and a compensation formulation program programmed to formulate anticipatory compensations to compensate for deviation of the machine from the predetermined stable running condition based on feedback information received from the machine, output from which program is provided to the model-based control unit as second teacher data, wherein the model-based control unit undergoes learning using the second teacher data to modify output of the causative signal.

2. The machine control system according to claim 1, wherein the anticipatory control unit provides the second teacher data to the model-based control unit when the feedback control unit is inactivated.

3. The machine control system according to claim 1, wherein the feedback information received by the anticipatory control unit is previous feedback control patterns.

4. The machine control system according to claim 1, wherein the feedback information received by the anticipatory control unit is information from the feedback control unit when the feedback control unit is inactivated.

5. The machine control system according to claim 1, wherein the model-based control unit comprises:

a forward model or map defining and simulating the input-output relationship of the machine, wherein the model or map outputs an estimated value of the indicative signal when receiving a causative signal, said forward model provided with the learning function; and a feedback controller for outputting the estimated value of the causative signal when receiving and comparing the target value of the indicative signal and the estimated value of the indicative signal from the forward model or map, output from said feedback controller being provided to the forward model unit; wherein the model-based control unit outputs the estimated value of the causative signal when receiving the target value of the indicative signal.

6. The machine control system according to claim 1, wherein the learning function provided in the model-based control unit is a fuzzy neural network, neural network, or cerebellar model arithmetic computer (CMAC).

7. A method for controlling an unstable running condition of a machine which is operable by a causative signal and the performance of which is indicatable by an indicative signal, said method being achieved using a control system comprising: (a) a mode-based control unit for outputting an estimated value of a causative signal when receiving an indicative signal, wherein the input-output relationship of the model-based control unit is the inverse of that of the machine, said model-based control unit receiving a target value of the indicative signal and being provided with a learning function which modifies output from the model-based control unit based on teacher data; and (b) a feedback control unit for providing first teacher data to the model-control unit, said feedback control unit receiving feedback information of an actual value of the indicative signal from the machine, and providing the feedback information to the model-based control unit as first teacher data, said method comprising the steps of:

(a) providing the feedback information as first teacher data to the model-control unit from the feedback control unit, wherein the model-based control unit undergoes learning using the first teacher data to modify its output of the causative signal;

(b) determining whether the running condition of the machine deviates from a predetermined stable running condition;

(c) inactivating the feedback control unit when the running condition of the machine deviates from a stable running condition;

(d) formulating anticipatory compensations to compensate for deviation of the machine from the predetermined stable running condition based on feedback information received from the machine; and (e) providing the anticipatory compensations to the model-based control unit as second teacher data, wherein the model-based control unit undergoes learning using the second teacher data to modify output of the causative signal.

8. The method according to claim 7, wherein the feedback information received in step (d) is previous feedback control patterns.

9. The method according to claim 8, wherein the previous feedback control patterns are stored in a memory, and based on the previous feedback control patterns, the second teacher data are increased or decreased in a direction compensating for the deviation of the machine.

10. The method according to claim 7, wherein the feedback information received in step (d) is information from the feedback control unit when the feedback control unit is inactivated.

11. The method according to claim 10, wherein the information obtained when the feedback control unit is inactivated is the duration of the stable running condition of the machine or the sum of the compensations by the first teacher data from when the feedback control unit is activated.

12. The method according to claim 7, wherein the model-based control unit comprises: a forward model or map defining and simulating the input-output relationship of the machine, wherein the model or map outputs an estimated value of the indicative signal when receiving a causative signal, said forward model provided with the learning function; and a feedback controller for outputting the estimated value of the causative signal when receiving and comparing the target value of the indicative signal and the estimated value of the indicative signal from the forward model or map, output from said feedback controller being provided to the forward model unit; wherein the model-based control unit outputs the estimated value of the causative signal when receiving the target value of the indicative signal.

* * * * *